United States Patent
Gouby et al.

(10) Patent No.: US 10,486,833 B2
(45) Date of Patent: Nov. 26, 2019

(54) METHOD FOR MONITORING AN AIRCRAFT ENGINE OPERATING IN A GIVEN ENVIRONMENT

(71) Applicant: Safran Aircraft Engines, Paris (FR)

(72) Inventors: Aurelie Gouby, Moissy-Cramayel (FR); Guillaume Bothier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 79 days.

(21) Appl. No.: 15/525,574

(22) PCT Filed: Nov. 10, 2015

(86) PCT No.: PCT/FR2015/053050
§ 371 (c)(1),
(2) Date: Aug. 17, 2017

(87) PCT Pub. No.: WO2016/075409
PCT Pub. Date: May 19, 2016

(65) Prior Publication Data
US 2018/0170580 A1    Jun. 21, 2018

(30) Foreign Application Priority Data
Nov. 10, 2014  (FR) ..................................... 14 60853

(51) Int. Cl.
*B64F 5/60*      (2017.01)
*G05B 23/02*   (2006.01)
(Continued)

(52) U.S. Cl.
CPC ............ *B64F 5/60* (2017.01); *G05B 23/0283* (2013.01); *G06F 17/18* (2013.01); *G07C 5/0841* (2013.01); *B64D 2045/0085* (2013.01)

(58) Field of Classification Search
CPC ....... B64F 5/60; G05B 23/0283; G06F 17/18; G07C 5/0841
See application file for complete search history.

(56) References Cited

U.S. PATENT DOCUMENTS 4,215,412 A * 7/1980 Bernier .................... G07C 3/00
                                                                       701/100
4,729,102 A * 3/1988 Miller, Jr. .............. G07C 5/085
                                                                         360/5
(Continued)

FOREIGN PATENT DOCUMENTS

EP      1 630 633 A2    3/2006
EP      1 630 633 A3    11/2008
(Continued)

OTHER PUBLICATIONS

Search Report in French Application No. 1460853 dated Sep. 21, 2015, with English translation coversheet.
(Continued)

*Primary Examiner* — Behrang Badii
*Assistant Examiner* — Daniel L Greene
(74) *Attorney, Agent, or Firm* — Womble Bond Dickinson (US) LLP (57) ABSTRACT

The present invention relates to method for monitoring an engine (1) of an aircraft (2) operating in a given environment. The invention is characterized in that it comprises the implementation, via means for data processing (31), of the steps of: (a) receiving a sequence of n-tuples ($x_{1\text{-}exec}, \ldots x_{n\text{-}exec}, y_{exec}$) of physical-parameter values relating to said aircraft (2) engine (1), including at least one endogenous parameter specific to the operation of the engine (1) and at least one exogenous parameter specific to said environment; (b) For each n-tuple ($x_{1\text{-}exec}, \ldots x_{n\text{-}exec}, y_{exec}$) of the received sequence, calculating, according to a regression model, a standardized value ($y_{exec\text{-}norm}$) of the endogenous parameter (Continued)

in relation to the exogenous parameters; (c) identifying at least one stabilized phase in said normalized sequence of n-tuples ($x_{1\text{-}exec}, \ldots x_{n\text{-}exec}; y_{exec\text{-}norm}$) from a set of phase signatures; (d) for each stabilized phase, calculating the mean values of the physical parameters on the portion of the sequence of n-tuples ($x_{1\text{-}exec}, \ldots x_{n\text{-}exec}; y_{exec}$) corresponding to the stabilized phase, in order to obtain an n-tuple ($x_1 \ldots x_n; y$) defining a recurrent point of said flight of the aircraft (2).

13 Claims, 7 Drawing Sheets

(51) Int. Cl.
*G06F 17/18* (2006.01)
*G07C 5/08* (2006.01)
*B64D 45/00* (2006.01)

(56) References Cited

U.S. PATENT DOCUMENTS

| | | | | |
|---|---|---|---|---|
| 6,236,955 | B1* | 5/2001 | Summers | G06Q 10/10 434/107 |
| 8,775,341 | B1* | 7/2014 | Commons | G06N 3/0454 706/20 |
| 2004/0133355 | A1* | 7/2004 | Schneider | G06N 3/126 702/19 |
| 2005/0040945 | A1* | 2/2005 | Parks, III | G08B 21/20 340/539.27 |
| 2005/0261820 | A1* | 11/2005 | Feeney | F01D 19/00 701/100 |
| 2009/0006169 | A1* | 1/2009 | Wetzer | G06Q 10/0631 705/7.14 |
| 2012/0192143 | A1* | 7/2012 | Elaasar | G06F 8/35 717/104 |
| 2013/0211768 | A1* | 8/2013 | Gerez | G01M 15/05 702/113 |
| 2014/0201126 | A1* | 7/2014 | Zadeh | G06K 9/627 706/52 |
| 2014/0279721 | A1* | 9/2014 | Siegel | G06N 5/02 706/11 |
| 2014/0372091 | A1* | 12/2014 | Larimore | G06F 17/5009 703/2 |
| 2015/0142214 | A1* | 5/2015 | Cox | G05D 1/0202 701/3 |
| 2015/0235143 | A1* | 8/2015 | Eder | G16H 50/50 706/12 |
| 2016/0096634 | A1* | 4/2016 | Bothier | G05B 23/0243 701/99 |
| 2016/0140155 | A1* | 5/2016 | Bothier | G05B 23/024 707/812 |

FOREIGN PATENT DOCUMENTS

FR 2 939 928 A1 6/2010
FR 2 971 595 A1 8/2012

OTHER PUBLICATIONS

International Search Report and Written Opinion in PCT/FR2015/053050 dated Mar. 11, 2016, with English translation.

\* cited by examiner

METHOD FOR MONITORING AN AIRCRAFT ENGINE OPERATING IN A GIVEN ENVIRONMENT

GENERAL TECHNICAL FIELD

The present invention relates to the field of "Health Monitoring" of aeronautical equipment.

More specifically, it relates to a method for monitoring an aircraft engine operating in a given environment.

STATE OF THE ART

Health Monitoring refers to the tracking of the development of the health and condition of a piece of equipment, in particular a turbine engine, all along its lifetime.

One of the objects of Health Monitoring is to anticipate and plan operations for maintenance in a sufficiently relevant way for avoiding any problem which may cause a malfunction or even a failure (with probably dramatic consequences if it takes place in the air). For this purpose, it is sought to finely follow all the accessible engine parameters giving the possibility of predict preventive rather than curative maintenance operations (which are notably more expensive).

The setting into place of the monitoring of the engine requires fine know how on the operation of the engine depending on its own operating parameters (so called "endogenous" parameters, for example the pressure at the inlet of the combustion chamber, the temperature of the exhaust gases, etc.) but also external parameters, related to the environment (so called "exogenous" parameters, for example the altitude or the temperature of the inflowing air).

It was proposed to analyze the behavior of an engine by comparison with behaviors encountered in the past (see patent application FR2971595). To do this, the engines have to be able to be compared with each other, i.e. the influence of the context should be suppressed on the studied parameters, in other words standardize them (for example, Sub-Saharan flights have a temperature of the exhaust gases which will be higher than the normal temperature, without however the operation of the engine being abnormal).

These standardization methods, which operate by learning a model, are built with a specific and representative point of the flight, called the "snapshot", which are recurring points within flights.

If, for civil engines where the snapshot phase is typically a cruising phase, these methods provide entire satisfaction, the situation is more complicated for military engines. Indeed, the flight profile is different: a reconnaissance aircraft constantly changes velocity and altitude.

The modelling via an "average" operation thus allows with very great difficulty the taking into account of the operating conditions of an engine of a fighter plane which may be extended to its limits under these very severe external conditions during certain missions.

Therefore it would be desirable to have in a reliable, efficient and reproducible way or monitoring the operation of an aircraft engine including military ones, regardless of the variety, the diversity and the extent of its operations.

PRESENTATION OF THE INVENTION

The present invention proposes according to a first aspect, a method for monitoring an aircraft engine operating in a given environment, characterized in that it comprises the application by data processing means of steps for:

(a) Receiving a sequence of n-uplets of values of physical parameters relating to said aircraft engine, at least one endogenous parameter of which specific to the operation of the engine and at least one exogenous parameter specific to said environment, said values being measured during over time for sensors so that each n-uplet of the sequence defines a point of a flight of said aircraft, a set of reference sequences of n-uplets of values of said physical parameters being stored in a database stored on the data storage means;

(b) For each n-uplet of the received sequence, calculation according to a regression model associated with a sub-set of said set of reference sequences of n-uplets, of a standardized value of the endogenous parameter relatively to the exogenous parameters, so as to obtain a sequence of standardized n-uplets;

(c) Identifying at least one stabilized phase in said standardized sequence of n-uplets from a set of signatures of phases stored in said database of the data storage means, each signature being defined by an n-uplet of values of the physical parameters and an associated n-uplet of variance values, a stabilized phase corresponding to a portion of said sequence representative of a flight time above a given threshold and wherein the values of the standardized n-uplets coincide with the values of the n-uplet of a signature within the associated variance;

(d) For each stabilized phase, calculating average values of the physical parameters on the portion of the sequence of n-uplets corresponding to the stabilized phase, so as to obtain an n-uplet defining a snapshot of said flight of the aircraft, and transmission to interface means.

The standardization of the endogenous parameters gives the possibility of getting rid of the context and of being able to compare two flights, and the use of the signatures gives the possibility of finding stabilized phases and thereby snapshots (recurring points) characterizing easily and efficiently the behavior of the engine relative to known behaviors.

According to other advantageous features and non-limiting features:

step (a) comprises the separation of the values of the exogenous parameters and of the values of the endogenous parameters;

step (b) comprises for each n-uplet of the received sequence, a preliminary step (b0) for determining an exogenous class of the n-uplet according to the values of the exogenous parameters of said n-uplet, from among a plurality of exogenous classes each defined by the values of the exogenous parameters of a sub-set of said set of reference sequences of n-uplets;

step (b0) comprises the projection of said n-uplet in the context classes so as to identify the closest exogenous class according to a distance criterion;

the regression model used in step (b) for an n-uplet of the received sequence is the model associated with the exogenous class determined for said n-uplet;

the method comprises a preliminary phase for treating said set of reference sequences of n-uplets of the database, comprising the application by data processing means of steps for:

(a0) classifying the reference sequences of n-uplets so as to generate said plurality of exogenous classes;

(a1) for each exogenous class, determining said regression model associated with the sub-set of said set of reference sequences of n-uplets by a regression modeling the value of the endogenous parameter according to the values of the exogenous parameters from the set of n-uplets of the exogenous class;

(a2) for each n-uplet of the set of reference sequences, calculating for the exogenous class of the n-uplet an estimated value of the endogenous parameter and of an associated residue;

(a3) For each n-uplet of the set of reference sequences, calculating the standardized value of the endogenous parameter relatively to the exogenous parameters, in order to obtain a set of standardized reference sequences of n-uplets;

(a4) for each reference sequence of standardized n-uplets, identifying at least one stabilized phase in said standardized reference sequence of n-uplets, a stabilized phase corresponding to a portion of said sequence representative of a flight time greater than a given threshold and wherein the values of the standardized n-uplets are constant within a given variance;

(a5) for each stabilized phase of each reference sequence, calculating average values of the physical parameters on the portion of the sequence of n-uplets corresponding to the stabilized phase, so as to obtain an n-uplet defining a potential snapshot of a flight of the aircraft;

(a6) classifying the n-uplets defining a potential snapshot obtained so as to generate a plurality of cells, each associated with a sub-set of n-uplets defining a potential snapshot;

(a7) for at least one cell generated, calculating an n-uplet of values of physical parameters and an n-uplet of associated variance values so as to define a signature of the phase associated with the cell, and storage of the signatures of the phases in said database of the means for storing data.

the classification of the steps (a0) and (a6) is applied according to a non-monitored method selected from among the algorithm of the k-averages, the method of the self-adaptive Kohonen maps and the hierarchical ascending classification (HAC);

step (a6) comprises, for each generated cell, the calculation of a density of the cell defined as the number of reference sequences for which the cell comprises at least one n-uplet defining an obtained potential snapshot, the step (a7) being applied for the cells having the highest density;

each endogenous parameter is selected from among a pressure at the outlet of a booster of the engine, a static pressure at the inlet of a combustion chamber of the engine, a temperature at the outlet of the booster of the engine, a temperature of the exhaust gases of the engine, a mass flow rate of fuel at the inlet of a high-pressure compressor of the engine, and a high-pressure rotation conditions at the inlet of the high-pressure compressor of the engine;

each exogenous parameter is selected from among an altitude, a temperature at the inlet of a fan of the engine, and a low pressure rotation conditions at the inlet of the fan of the engine;

the sensors are integrated into the engine, said sequence of n-uplets being received from the engine via an Aircraft Communication Addressing and Reporting System (ACARS) transmission;

the n-uplets of a sequence are measured by sensors at a regular frequency comprised between 0.1 Hz and 10 Hz;

the method comprises the addition of the received sequence of n-uplets to said set of reference sequences of n-uplets.

According to a second aspect, the invention relates to a piece of equipment for monitoring an aircraft engine operating in a given environment, comprising:

data processing means, data storage means storing in a database:

a set of reference sequences of n-uplets of values of physical parameters relating to said aircraft engine, at least one endogenous parameter of which, specific to the operation of the engine and at least one exogenous parameter specific to said environment, and a set of phase signatures, each signature being defined by an n-uplet of values of the physical parameters and an n-uplet of values of associated variance, interface means, the piece of equipment being characterized in that the data processing means are configured for applying:

A module for receiving a sequence of n-uplets of values of the physical parameters relating to said aircraft engine, said values being measured over time by sensors so that each n-uplet of the sequence defines a point of a flight of said aircraft;

A computing module, for each n-uplet of the received sequence, according to a regression model associated with a sub-set of said set of reference sequences of n-uplets, a standardized value of the endogenous parameter relatively to the exogenous parameters, so as to obtain a sequence of standardized n-uplets;

A module for identifying at least one stabilized phase in said standardized sequence of n-uplets from said set of phase signatures, a stabilized phase corresponding to a portion of said sequence representative of a flight time greater than a given threshold and wherein the values of the standardized n-uplets coincide with the values of the n-uplet of a signature to within the associated variance;

A module, for each stabilized phase for calculating average values of the physical parameters on the portion of the sequence of n-uplets corresponding to the stabilized phase, so as to obtain an n-uplet defining a snapshot of said flight of the aircraft, and module for transmission to the interface means.

According to other advantageous and non-limiting characteristics:

the data processing module is further configured for applying:

A module for classifying reference sequences of n-uplets so as to generate a plurality of exogenous classes each defined by the values of the exogenous parameters of a sub-set of said set of reference sequences of n-uplets;

A module for determining, for each exogenous class, of said regression model associated with a sub-set of said set of reference sequences of n-uplets by a regression modelling the value y of the endogenous parameter according to the values of the exogenous parameters from the set of n-uplets of the exogenous class;

A module for calculating, for each n-uplet of the set of reference sequences, an estimated value of the endogenous parameter and a residue associated for the exogenous class of the n-uplet;

A module for computing, for each n-uplet of the set of reference sequences, the standardized value of the endogenous parameter relatively to the exogenous parameters, so as to obtain a set of reference sequences of standardized n-uplets;

A module for identifying, for each reference sequence of standardized n-uplets, at least one stabilized phase in said standardized reference sequence of n-uplets, a stabilized phase corresponding to a portion of said sequence representative of a flight time greater than a given threshold and wherein the values of the standardized n-uplets are constant to within a given variance;

A module for calculating, for each stabilized phase of each reference sequence, average values of the physical parameters on the portion of the sequence of n-uplets corresponding to the stabilized phase, so as to obtain an n-uplet defining a potential snapshot of a flight of the aircraft;

A module for classifying n-uplets defining a potential snapshot obtained so as to generate a plurality of cells, each being associated with a sub-set of the n-uplets defining a potential snapshot;

A module for calculating, for at least one generated cell, an n-uplet of values of the physical parameters and an n-uplet of associated variance values so as to define a phase signature associated with the cell, and storage of the phase signatures in said database of the data storage means.

According to a third aspect, the invention relates to a system comprising:

an aircraft comprising an engine and sensors;
a piece of equipment according to the second aspect of the invention for monitoring an aircraft engine operating in a given environment.

According to a fourth and a fifth aspect, the invention relates to a computer program product comprising code instructions for executing a method according to the first aspect of the invention for monitoring an operating aircraft engine in a given environment; and a storage means legible by a piece of computer equipment wherein the computer program product comprises code instructions for executing a method according to the first aspect of the invention for monitoring an operating aircraft engine in a given environment.

PRESENTATION OF THE FIGURES

Other features and advantages of the present invention will become apparent upon reading the description which follows of a preferential embodiment. This description will be given with reference to the appended drawings wherein.

DETAILED DESCRIPTION

Figure 1:
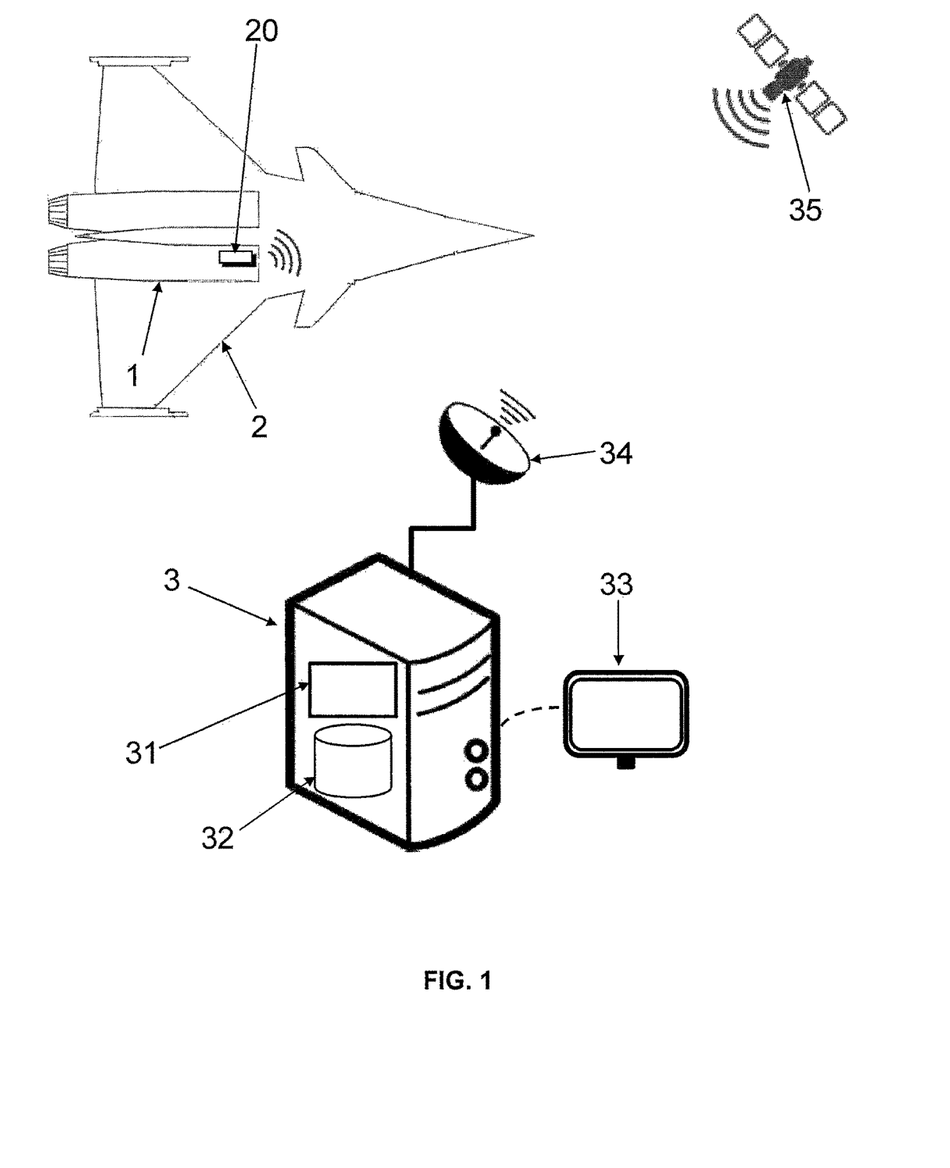
FIG. 1 illustrates an exemplary environment in which the method according to the invention is applied.

With reference to FIG. 1, the present method is a method for monitoring an operating aircraft 2 engine 1 in a given environment, in particular a military aircraft (for example a fighter plane) in a mission. The engine 1 is typically all or part of a turbine engine, in particular with double flow. The goal is to find flight phases wherein the behavior of the engine is identical regardless of the context, and to determine the representative points called snapshots, in other words "recurring points within flights" mentioned earlier, associated with these phases. These recurring points give the possibility of referring to behaviors already encountered in the past and therefore to more easily predict maintenance operations.

The present method may be applied to any measurement monitoring, but preferably, this is a "pseudo real time" monitoring: the engine 1 is equipped with sensors 20, which are active during the flight of the aircraft 2. The latter then regularly sends to the ground small instantaneous messages comprising the values of the measurements from the sensors 20. These messages are sent for example via satellite 35 (ACARS procedure) by means of the transmission means, and a piece of equipment 3 positioned on the ground comprising data processing means 31 (for example a processor) and data storage means 32 (for example a hard disc) receives the data contained in these messages via a base station 34 and processes them for applying the method.

One skilled in the art will understand that the latter is not limited to any procedure for transmitting measurements to the piece of equipment 3 (for example it is possible that the measurements are stored in the aircraft during the time of flight, and transmitted as a block to the piece of equipment 3 after landing). Moreover, the processing may be deferred in time. It is even conceivable that the piece of equipment 3 is integrated to the aircraft 2.

The piece of equipment 3 (or any other piece of equipment) is equipped with interface means 33 (such as a keyboard and a screen) for interacting, and in particular for displaying results (see later on).

Generally, the first step (a) of the present method consists in receiving with the data processing means 31 a sequence of n-uplets of values $x_{1\_exec} \ldots x_{n\_exec}; y_{exec}$ of physical parameters relating to said aircraft 2 engine 1, including at least one endogenous parameter specific to the operation of the engine 1 and at least one exogenous parameter specific to said environment.

By "n-uplet", is meant a vector comprising a value for each of the parameters. The values are measured over time by the sensors 20, and each n-uplet is associated with a time instant. A sequence designates a flight of the aircraft, and the n-uplets of the sequence are points of the flight, thereby obtained consecutively during the flight. Preferably, the values are acquired (and if necessary emitted) at regular time intervals, for example at a frequency comprised between 0.1 Hz and 10 Hz, in particular about 1 Hz (one value acquired for each parameter at each second of flight).

The endogenous or exogenous parameters are physical parameters. They thereby represent physical quantities such as a temperature or a pressure. One skilled in the art will select the type of physical quantity to be measured depending on the effects to be monitored on the engine. For each parameter, the associated sensor 20 is adapted to the quantity (thermometer, manometer, etc.).

As explained, certain physical parameters are "endogenous", and are therefore specific to the operation of the engine 1. In other words, these are parameters for which the value is directly impacted by the operation of the engine. For example mention will be made in the case of a dual flow military engine (with every time the associated code between brackets):

the pressure at the outlet of the booster (P23);

the static pressure at the inlet of the combustion chamber (PS32);

the temperature at the outlet of the booster (T23);

the temperature of the exhaust gases (TM49);

the mass flow rate of fuel at the inlet of the High-Pressure compressor (W25);

the High-Pressure rotation velocity at the inlet of the High-Pressure compressor (XN25.

The other physical parameters are "endogenous", and are therefore specific to the environment of the engine 1, i.e. the context. In other words, these are parameters for which the value is not impacted by the operation of the motor, but to which the motor is subjected. For example mention will be made in the case of a dual flow military engine (with at each time the associated code between brackets):

The altitude (ALTF);

The temperature at the inlet of the fan (T2);

The low pressure rotation conditions at the inlet of the fan (XN2).

An exogenous parameter (value x) is an "explanatory" or "predictive" variable, as opposed to an endogenous parameter (value y) which is a variable "to be explained" or "to be predicted". In other words, the value x of the exogenous parameter is a cause, while the value y of the endogenous parameter is a consequence.

An n-uplet $x_1 \ldots x_n$; y refers to a punctual acquisition: for values x of the exogenous parameters, values y of the endogenous parameters are measured. In the continuation of the present description, the example of an endogenous parameter (and n exogenous parameters) will be taken, and it will be understood that it is sufficient the repeat the steps of the method for each endogenous parameter if there are several of them, and that the number of exogenous parameters has no importance. In the examples, three exogenous parameters will be assumed.

A set of reference sequences of n-uplets $(x_{1i} \ldots x_{ni}; y_i)_{i \in [[1,p]]}$ of values of said physical parameters (p sequences) is stored in a database itself stored on the data storage means 32. Each sequence corresponds to a flight of a similar aircraft (with a similar engine), and for each of its flights one has a sequence of n-uplets. The n-uplets of the base each define reference values $y_i$ of the endogenous parameters for values $x_i$ of the exogenous parameters.

By "reference" sequences and values, is meant that they are acquired during known previous flights, i.e. they may be considered as being able to be utilized. Possible abnormal values have already been suppressed from the base.

The received sequence of n-uplets $x_{1\_exec} \ldots x_{n\_exec}; y_{exec}$ refers to the "monitored" sequence, i.e. that of the flight for which one seeks to monitor the engine 1 operating in a given environment As explained, this monitored sequence may just as well be a sequence obtained in real time (in particular in an ACARS operation) or else a sequence obtained in deferred time (n-uplets $x_{1\_exec} \ldots x_{n\_exec}; y_{exec}$ stored in the database and placed in a queue).

Learning Phase

The present method comprises two phases. The first is a learning phase and the second is an execution phase. Preferably, the learning phase is applied beforehand so as to generate the models which will be described later on (and if necessary storing them on data storage means 32), and the execution phase is then applied to each new reception of a sequence. This is the execution phase which allows monitoring of the engine 1, subject of the invention. The learning phase may be re-launched from time to time in order to update the models.

Alternatively, it is quite possible not to carry out the preliminary learning and to determine the models on an ad hoc basis at each application of the execution phase.

In the continuation of the present description the both phases will be described.

The learning phase may be considered as a set of steps for processing the sole data of the base (i.e. independently of the sequence of n-uplets $x_{1\_exec} \ldots x_{n\_exec}; y_{exec}$).

Figure 2A:
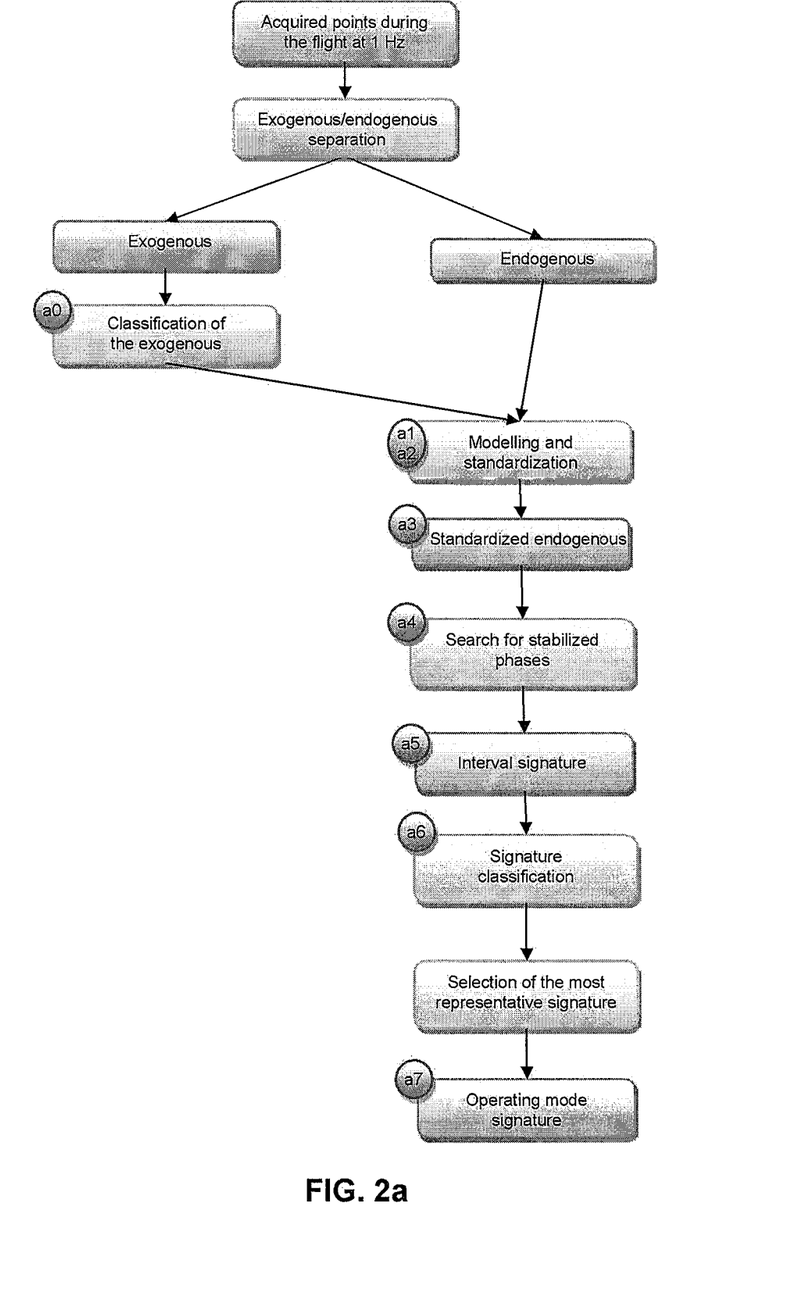
FIGS. 2a-2b illustrate steps of two phases of an example of the method according to the invention.

With reference to FIG. 2a, the learning phase begins by a step (a0) for classifying the reference sequences of n-uplets $(x_{1i} \ldots x_{ni}; y_i)_{i \in [[1,p]]}$ so as to generate said plurality of exogenous classes.

As the flight backgrounds of a military aircraft are very diverse, it is actually important to be able to classify them. Each "exogenous class" is defined by the values $(x_{1i} \ldots x_{ni})_{i \in [[1,pj]]}$ (pj designates the cardinal of the exogenous class j, the sum of the pj has the value p) of the exogenous parameters of a sub-set of said set of reference sequences of n-uplets $(x_{1i} \ldots x_{ni}; y_i)_{i \in [[1,p]]}$. In other words, this step consists in the partition of n-uplets $(x_{1i} \ldots x_{ni}; y_i)_{i \in [[1,p]]}$ without values of the endogenous parameters (i.e. their restriction to all or part of the exogenous parameters, in this case hyperplanes in our example with a single endogenous parameter) via non-supervised classification means (in particular selected from among the algorithm with k-averages, the method of self-adaptive Kohonen maps and the hierarchical ascending classification (HAC)). In order to reformulate again, each of the points of flights defined by an n-uplet $(x_{1i} \ldots x_{ni}; y_i)_{i \in [[1,p]]}$ is placed in a restricted sub-space (in terms of dimension) with exogenous parameters, and this space is partitioned into k classes (for example between 2 and 10), for which each of them will be representative of a general type of context wherein the exogenous parameters will have values similar between two flights (for example "low altitude in Qatar"). Each exogenous class is thereby associated with a sub-set of the set of reference sequences of n-uplets $(x_{1i} \ldots x_{ni}; y_i)_{i \in [[1,p]]}$, the sub-set consisting of "close" flights in terms of context.

The advantage of setting k for example between 2 and 10 is to define a maximum number of exogenous classes so that the classification is relevant (not having as many classes as points when the latter are all very far from each other.). An optimization method gives the possibility of selecting k so as to maximize the deviation between the different groups and to minimize the deviation between points of a same class).

Figure 3:
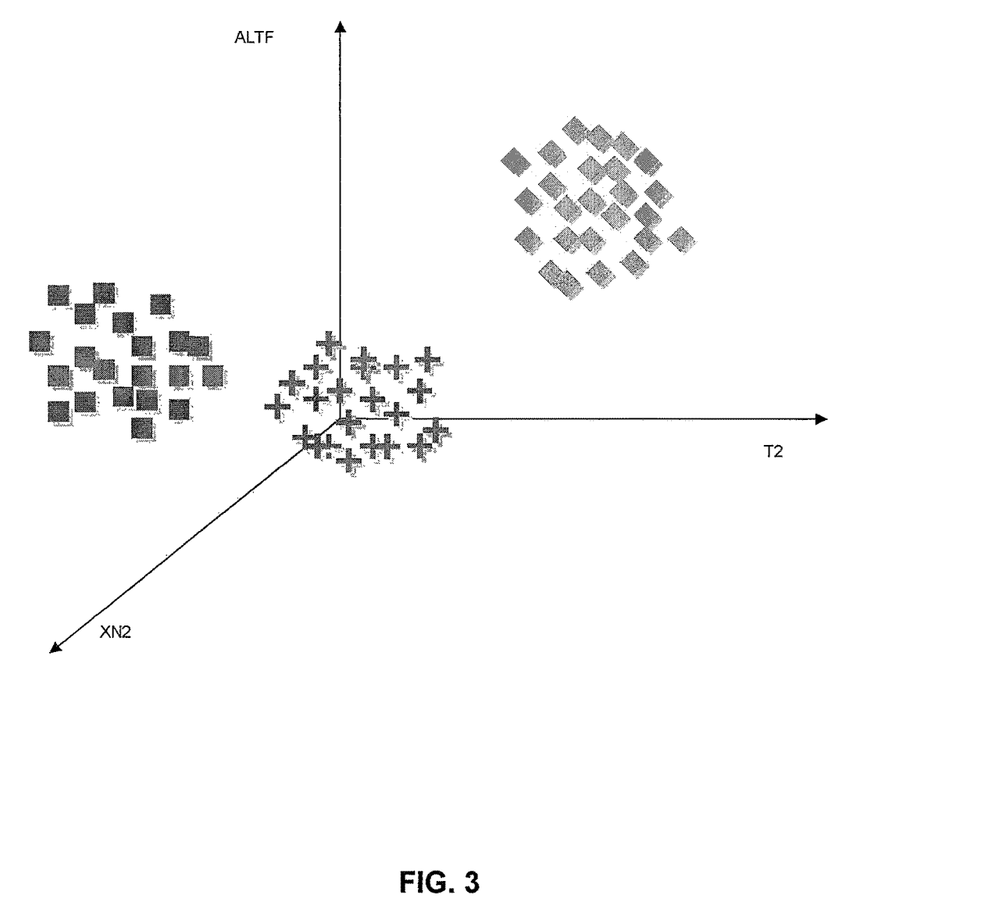
FIG. 3 illustrates an example of exogenous classes used in a method according to the invention.

FIG. 3 thereby illustrates an example representing the layout of the n-uplets $(x_{1i} \ldots x_{ni}; y_i)_{i \in [[1,p]]}$ in a three-dimensional space generated by the three exogenous parameters ALTF, T2 and XN2. Three exogenous classes are clearly seen which emerge from this.

This step is followed by a step (a1) for determining a plurality of regression models each associated with a sub-set of said set of reference sequences of n-uplets $(x_{1i} \ldots x_{ni}; y_i)_{i \in [[1,p]]}$ (in particular an exogenous class), by a regression modeling y according to the x on the values of the n-uplets $(x_{1i} \ldots x_{ni}; y_i)_{i \in [[1,p]]}$ of said sub-set (in other words those associated with the exogenous class). In the case when there are several endogenous parameters, this step is repeated so as to determine the regression models modeling each y according to the x. These regression models will be used in the execution phase.

The regression designates a set of well-known statistical methods to one skilled in the art for analyzing the relationship of a variable (here y) relatively to one or several other ones (here $x_1 \ldots x_n$). The step (a1) consists, in other words of determining functions $f^j$ (j is an index designating the j-th exogenous class) giving the possibility of approaching better the values $y_i$ according to the values $x_{1i} \ldots x_{ni}$, for a given link type. Thus linear, polynomial, exponential, logarithmic regressions, etc. are thereby known.

The selection of the type of link used is advantageously made depending on the aspect of the curve and may be made automatically by optimization while maximizing a determination coefficient, for example in the way described in the patent application FR2939928.

In a third step (a2), the learning phase comprises the calculation (repeated for each endogenous parameter), for each of the n-uplet $(x_{1i} \ldots x_{ni}; y_i)_{i \in [[1,p]]}$, of an estimated value $\hat{y}_i^j$ of the endogenous parameter and of an associated residue $res_i^j$, for the class j to which belongs the n-uplet $(x_{1i} \ldots x_{ni}; y_i)_{i \in [[1,p]]}$. The residue is the deviation between an estimated value and a measured value. From the regression models, these values are simply obtained by the formulae $\hat{y}_i^j = f^j(x_{1i} \ldots x_{ni})$, and $res_i^j = y_i - \hat{y}_i^j$, for $i \in [[1,pj]]$.

Once the regression model is generated, the data processing means 31 by inferring another model used in the execution phase: this is the standardization model. As explained, the goal is to withdraw the influence of the contexts on the endogenous parameters, in other words to make them standardized and comparable since they are reduced to the same flight conditions.

In step (a3), for each n-uplet $(x_{1i} \ldots x_{ni}; y_i)_{i \in [[1,p]]}$ of the set of the reference sequences, a standardized value $y_{i\_norm}^j$ of the endogenous parameter is thereby calculated relatively to the exogenous parameters, so as to obtain a set of reference sequences of standardized n-uplets $(x_{1i} \ldots x_{ni}; y_{i\_norm})_{i \in [[1,p]]}$. The standardization model associates with each value of an endogenous parameter the standardized value of this parameter. The standardization model is for example given by the formula $y_{i\_norm}^j = \bar{y}^j + res_i^j$, wherein $\bar{y}^j$ is the average value of the parameter y for the n-uplets of the exogenous class j. Indeed, since $\hat{y}_i^j$ is the prediction made from the exogenous variables and that $res_i^j = y_i - \hat{y}_i^j$, the application of the previous formula gives the possibility of subtracting the influence of the endogenous ones, and there only remains a signal centered on the average and for which the variability can no longer be explained by the context.

Once the endogenous parameters are standardized, stabilized phases will be sought during the flight. Thus, in a step (a4), for each reference sequence standardized n-uplets $(x_{1i} \ldots x_{ni}; y_{i\_norm})_{i \in [[1,p]]}$ are identified (if possible) at least one stabilized phase in said reference sequence of standardized n-uplets $(x_{1i} \ldots x_{ni}; y_{i\_norm})_{i \in [[1,p]]}$ a stabilized phase corresponding to a portion of said representative sequence of a flight time greater than a given threshold, for example ten minutes, (if the acquisition frequency is constant, then this time threshold corresponds to a threshold of the number of consecutive points) and wherein the values of the standardized n-uplets $(x_{1i} \ldots x_{ni}; y_{i\_norm})_{i \in [[1,p]]}$ are constant to within a given variance. In other words, a minimum duration t of a stabilized phase to be attained is set and for each parameter a tolerance on the variance. It should be noted that a pilot of a military airplane remains often for not much time in stable phases, this is why it is desirable to test several minimum time thresholds and several variance window sizes. In a known way, the variance is calculated as the average of the squared residues.

Figure 4:
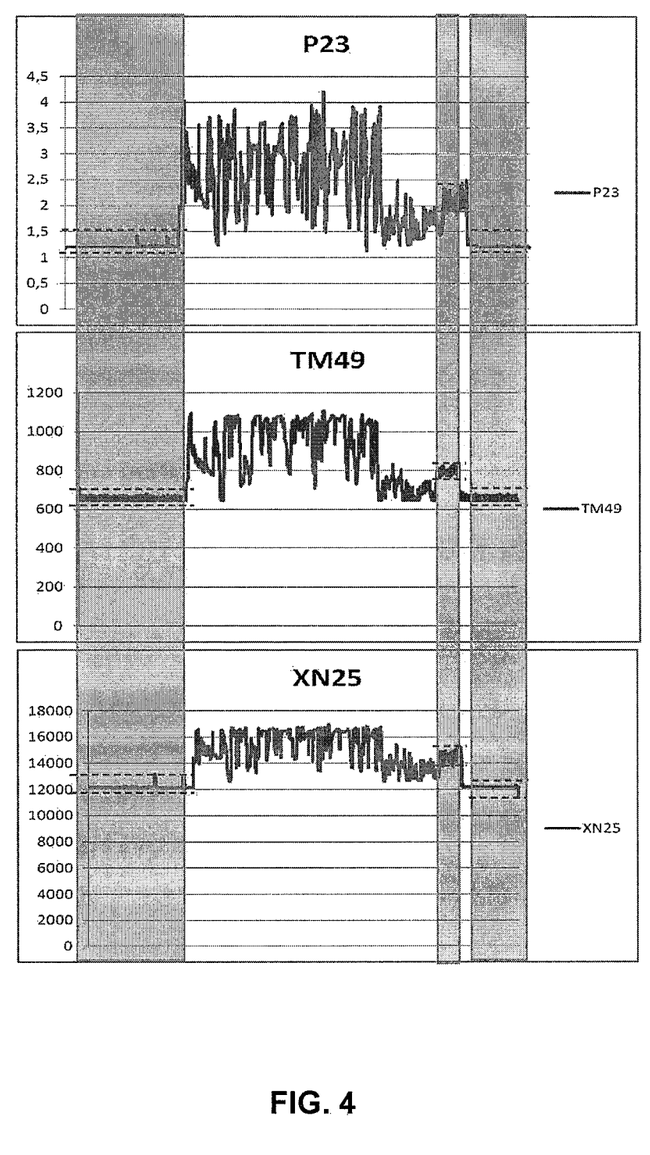
FIG. 4 illustrates examples of stabilized phases identified during the application of the method according to the invention.

FIG. 4 illustrates the value sequences for three (standardized) endogenous parameters P23, TM49 and XN25. Three stabilized phases are located in which each of the endogenous parameters has a substantially constant value.

Once the phases are stabilized found in the different learning flights (i.e. for each sequence of the set), each phase (step (a5)) is summarized as an n-uplet $\overline{x_1} \ldots \overline{x_n}; \overline{y}$ by averaging the values parameterized on the phase (i.e. on the n-uplets $(x_{1i} \ldots x_{ni}; y_{i\_norm})_{i \in [[1,p]]}$ of each sequence portion corresponding to the phase). Thus for a flight a matrix of size n×k is obtained wherein n is the number of parameters and k the number of stabilized phases found during the flight. The n-uplet $\overline{x_1} \ldots \overline{x_n}; \overline{y}$ defines a "potential" snapshot of a flight of the aircraft 2, and thus potentially forms a "signature" of the phase.

In the following step (a6), the n-uplets $\overline{x_1} \ldots \overline{x_n}; \overline{y}$ defining a potential snapshot, obtained, are classified by the data processing means 31 in the way of how this is done in step (a0). As before, a plurality of non-supervised methods may be applied, and preferably the method of the self-adaptive Kohonen maps is selected.

Figure 5A:
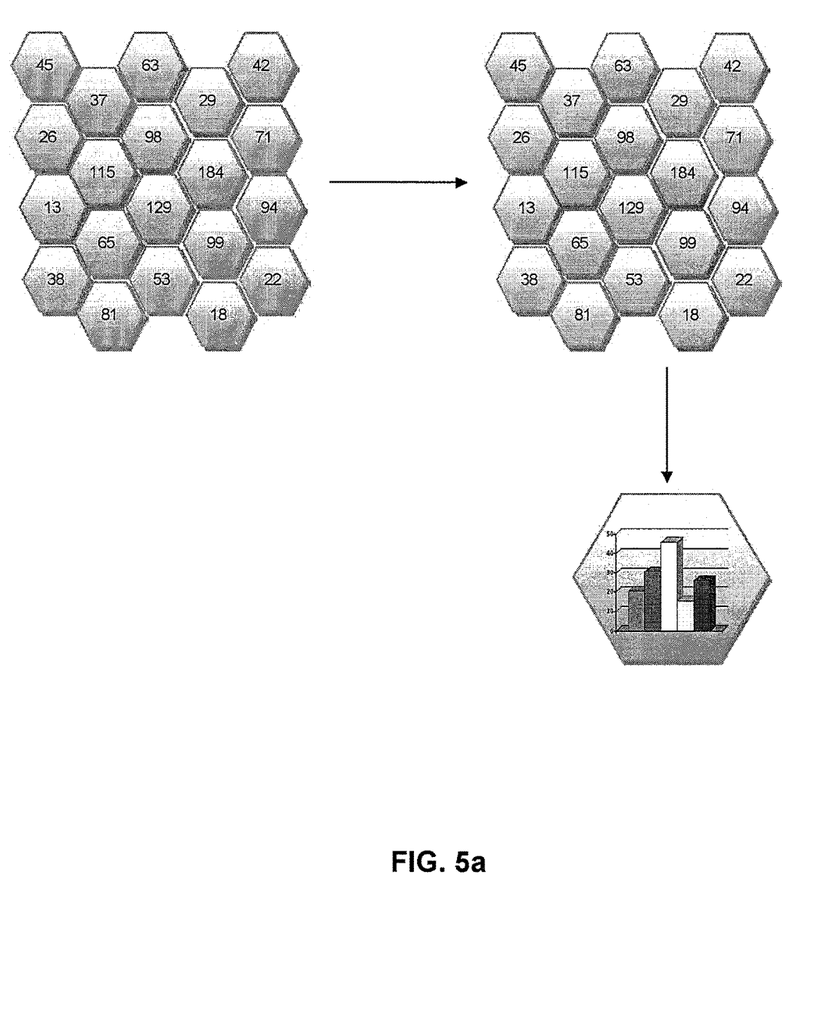
FIGS. 5a-5b illustrate examples of cells used during the application of the method according to the invention.

The classification gives the possibility of generating a plurality of cells according to a map as illustrated in FIG. 5a, each associated with a sub-set of the n-uplets $\overline{x_1} \ldots \overline{x_n}; \overline{y}$ defining a potential snapshot.

This step advantageously comprises, for each generated cell, the calculation of a "density" of the cell defined as the number of reference sequences for which the cell comprises at least one n-uplet $\overline{x_1} \ldots \overline{x_n}; \overline{y}$ defining an obtained potential snapshot (in other words, the number of potential snapshots is calculated per cell, by only counting one point if a flight (i.e. a sequence) comprises several times a same phase).

The number displayed on each cell of FIG. 5a is thus the number of projected flights in each cell.

Figure 5B:
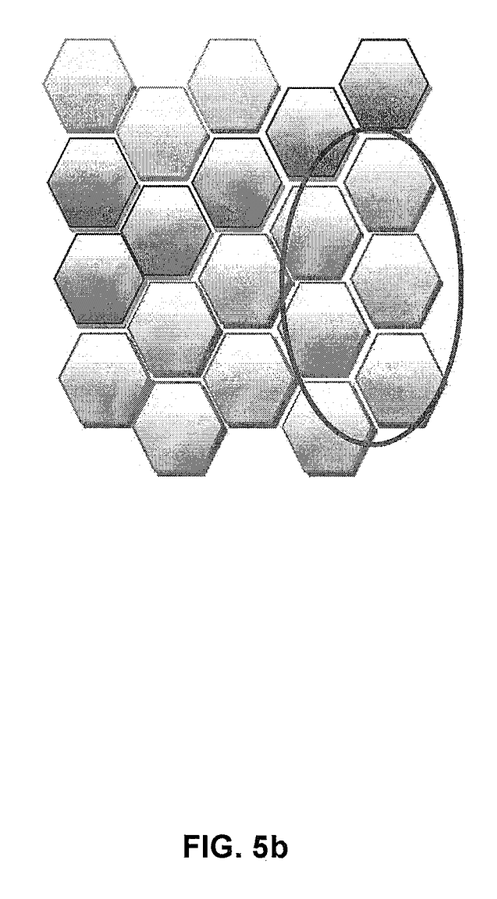

Said or the most dense cells are identified (the cell of 184 flights in the example of FIG. 5a), and selected. Alternatively, a minimum cell density threshold may be provided. In every case, if the base of n-uplets is not sufficiently vast for building a relevant map, grouping certain neighboring classes into "metaclasses" may be provided, as illustrated in FIG. 5b, or building a map with less cells.

For at least one generated cell (in particular those where the density is the highest, i.e. those where the points are really "recurring"), a signature of the cell is calculated in step (a7). This signature is a signature of a recurring phase type of the flights of the aircraft.

A signature s is defined by an n-uplet $x_{1s} \ldots x_{ns}; y_s$ of values of the physical parameters and an n-uplet $var_s(x_1) \ldots var_s(x_n); var_s(y)$ of values of the associated variance. The n-uplet $x_{1s} \ldots x_{ns}; y_s$ of values is typically the "representative" of the cell, i.e. the center of the cell in the sense of Kohonen, or the average of the n-uplets $\overline{x_1} \ldots \overline{x_n}; \overline{y}$ of the cell.

The variance is the "actual" variance of the parameters of the cell, i.e. typically that $$var_s(x) = \frac{1}{m-1} \sum_k^m (x_k^s - \bar{x}^s)^2,$$

wherein m is the number of n-uplets of the cell (it is noted that this formula is the same for endogenous variables y).

The obtained phase signatures are stored in said database of the data storage means (32).

Execution Phase

As explained earlier, the learning phase represents a preparatory study for accelerating the execution phase (which corresponds to the core of the present method according to the invention). The learning phase may alternatively be carried out "in the same time" than the execution phase. In the description of this portion reference will be made to all the associated formulae described earlier.

Figure 2B:
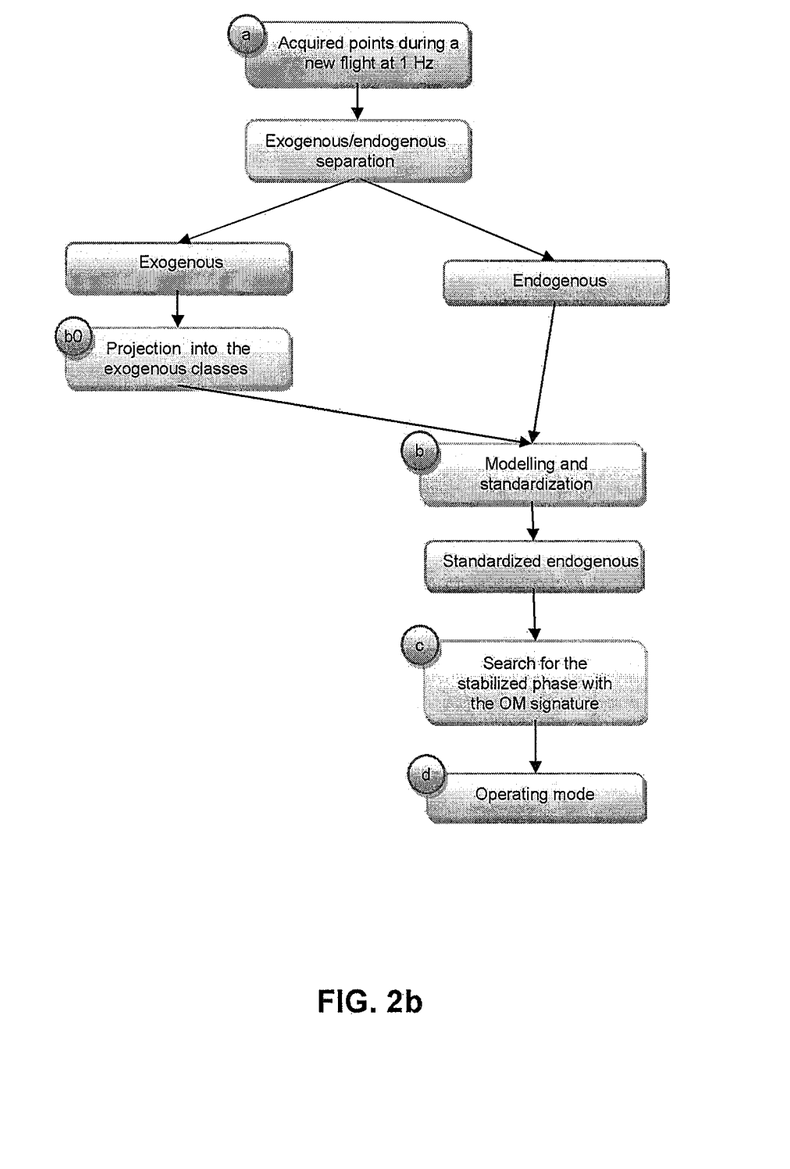

This phase gives the possibility of monitoring the engine 1 when operating in a given environment for a flight defined by a sequence of n-uplets $x_{1\_exec} \ldots x_{n\_exec}$; $y_{exec}$ of values of the physical parameters of the engine 1.

This phase is illustrated by FIG. 2b. If the learning phase was applied earlier, the models and the signatures may be loaded from the data storage means 32, as illustrated in this figure.

Step (a), already mentioned, sees the reception of the n-uplets $x_{1\_exec} \ldots x_{n\_exec}$; $y_{exec}$ to be processed. This step comprises the separation of the values $x_{1\_exec} \ldots x_{n\_exec}$ exec of the exogenous parameters and of the values $y_{exec}$ of the endogenous parameters (for example by means of a list).

In a step (b), for each point of the sequence, a value of each endogenous parameter is calculated for the values $x_{1\_exec} \ldots x_{n\_exec}$ of the exogenous parameters according to a regression model associated with a sub-set of said set of reference sequences of n-uplets $(x_{1i} \ldots x_{ni}; y_i)_{i \in [[1,p]]}$ (in this case the model associated with an exogenous class, determined if necessary in the learning phase). For this, the step (b) comprises a preliminary step (b0) for determining an exogenous class of the n-uplet according to the values $x_{1\_exec} \ldots x_{n\_exec}$ of the exogenous parameters of said n-uplet, from among a plurality of exogenous classes, each defined by the values $(x_{1i} \ldots x_{ni})_{i \in [[1,p]]}$ of the exogenous parameters or a sub-set of said reference sequence set of n-uplets $(x_{1i} \ldots x_{ni}; y_i)_{i \in [[1,p]]}$. In this case, the exogenous class of the n-uplet is typically the one for which it is the closest (according to its exogenous parameters).

For this, this determination is for example accomplished by projecting said n-uplet in the exogenous classes so as to identify the closest exogenous class according to a distance criterion (a standard method wherein the data processing means 31 calculate for each exogenous class a distance (according to a given distance criterion) between the class and a restriction $x_{1\_exec} \ldots x_{n\_exec}$ to the exogenous parameters of said n-uplet, and the class j for which the distance is the shortest is selected).

Once the exogenous class j is determined, the calculation is accomplished as described earlier by first of all calculating an estimated value $\hat{y}_{exec}^j$ of the endogenous parameter with the formula $\hat{y}_{exec}^j = f^j(x_{1\_exec} \ldots x_{n\_exec})$. The associated residue $Res_{exec}$ is then calculated: $res_{exec}^j = y_{exec} - \hat{y}_{exec}^j$. Finally, the standardized value is directly obtained by the formula $y_{exec\_norm} = \bar{y}^j + res_{exec}^j$.

Then a sequence of standardized n-uplets, $x_{1\_exec} \ldots x_{n\_exec}$; $y_{exec\_norm}$ is obtained, i.e. for which the influence of the context has been suppressed.

In step (c), the stabilized phases are identified from the set of phase signatures stored in said database of the data storage means 32.

As explained, a stabilized phase corresponds to a portion of said representative sequence of a flight time greater than a given threshold and wherein the values of the standardized n-uplets $x_{1\_exec} \ldots x_{n\_exec}$; $y_{exec\_norm}$ coincide with the values of the n-uplet $x_{1s} \ldots x_{ns}$; $y_s$ with a signature to within the associated variance.

Practically, if during a duration of at least the given threshold, the deviation between each parameter $x_{1\_exec} \ldots x_{n\_exec}$; $y_{exec\_norm}$ of the standardized n-uplet and each corresponding parameter of the n-uplet $x_{1s} \ldots x_{ns}$; $y_s$ of a signature s, to the corresponding value $var_s(x_1) \ldots var_s(x_n)$; $var_s(y)$ of the n-uplet with variance associated with a signature s, then this may be a known stabilized phase, and a snapshot may be identified.

In step (d), these snapshots are defined as an n-uplet $\overline{x_1} \ldots \overline{x_n}$; $\bar{y}$ of average values of the physical parameters on the portion of the sequence of n-uplets $x_{1\_exec} \ldots x_{n\_exec}$; $y_{exec\_norm}$ corresponding to the stabilized phase.

These snapshots are then transmitted to interface means 33 for being utilized (and/or for example stored on the storage means 32), for example determining maintenance steps to be provided, by using known models.

It should be noted that the received sequence of n-uplets $x_{1\_exec} \ldots x_{n\_exec}$; $y_{exec}$ may then be added to said set of reference sequences of n-uplets $(x_{1i} \ldots x_{ni}; y_i)_{i \in [[1,p]]}$ (for reinforcing the learning base and refining the models).

Equipment and System

The piece of equipment 3 (illustrated in FIG. 1) for applying the method which has just been described (monitoring of an aircraft 2 engine 1 during operation in a given environment) comprises data processing means 31, data storage means 32, and interface means 33.

The means for storing data 32 store in a database:
- The set of reference sequences of n-uplets $(x_{1i} \ldots x_{ni}; y_i)_{i \in [[1,p]]}$ of values of physical parameters relating to said aircraft 2 engine 1, and
- The set of signatures of phases, each signature being defined by an n-uplet $x_{1s} \ldots x_{ns}$; $y_s$ of values of the physical parameters and an n-uplet $var_s(x_1) \ldots var_s(x_n)$; $var_s(y)$ of values of associated variance, The data processing means 31 are configured for applying:
- A module for receiving a sequence of n-uplets $x_{1\_exec} \ldots x_{n\_exec}$; $y_{exec}$ of values of the physical parameters relating to said aircraft 2 engine 1, said values being measured over time by sensors 20 so that each n-uplet of the sequence defines a flight point of said aircraft (2);
- A calculation module, for each n-uplet $x_{1\_exec} \ldots x_{n\_exec}$; $y_{exec}$ of the received sequence, according to a regression model associated with a sub-set of said reference sequence set of n-uplets $(x_{1i} \ldots x_{ni}; y_i)_{i \in [[1,p]]}$, of a standardized value $y_{exec\_norm}$ of the endogenous parameter based on the exogenous parameters, so as to obtain a sequence of standardized n-uplets $x_{1\_exec} \ldots x_{n\_exec}$; $y_{exec\_norm}$
- A module for identifying at least one stabilized phase in said sequence of standardized n-uplets $x_{1\_exec} \ldots x_{n\_exec}$; $y_{exec\_norm}$ from said set of phase signatures, a stabilized phase corresponding to a portion of said sequence representative of a flight time greater than a given threshold and wherein the values of the standardized n-uplets $x_{1\_exec} \ldots x_{n\_exec}$; $y_{exec\_norm}$ coincide with the values of the n-uplet $x_{1s} \ldots x_{ns}$; $y_s$ of a signature to within the associated variance;
- A calculation module, for each stabilized phase, of average values of the physical parameters on the portion of the sequence of n-uplets $x_{1\_exec} \ldots x_{n\_exec}$; $y_{exec\_norm}$ corresponding to the stabilized phase, so as to obtain an n-uplet $\overline{x_1} \ldots \overline{x_n}$; $\bar{y}$ defining a snapshot of said flight of the aircraft 2; and
- A module for transmitting snapshots to the interface means 33.

Preferably, the data processing means 31 also apply a determination module, for each n-uplet $x_{1\_exec} \ldots x_{n\_exec}$; $y_{exec}$ of the received sequence, of an exogenous class of the n-uplet according to the values $x_{1\_exec} \ldots x_{n\_exec}$ of the exogenous parameters of said n-uplet, from among a plurality of exogenous classes, each defined by the values $(x_{1i} \ldots x_{ni})_{i \in [[1,p]]}$ of the exogenous parameters of a sub-set of said reference sequence set of n-uplets $(x_{1i} \ldots x_{ni}; y_i)_{i \in [[1,p]]}$. The regression model associated with a sub-set of said reference sequence set of n-uplets $(x_{1i} \ldots x_{ni}; y_i)_{i \in [[1,p]]}$ is then the model associated with the exogenous class.

This determination module may achieve the projection of said n-uplet in the classes of contexts so as to identify the closest exogenous class according to a distance criterion.

If the piece of equipment 3 also applies the learning phase, then the data processing module 31 is further configured for applying:

- A module for classifying reference sequences of n-uplets $(x_{1i} \ldots x_{ni}; y_i)_{i \in [[1,p]]}$ so as to generate a plurality of exogenous classes each defined by the values $(x_{1i} \ldots x_{ni})_{i \in [[1,p]]}$ of the exogenous parameters of a sub-set of said reference sequence set of n-uplets $(x_{1i} \ldots x_{ni}; y_i)_{i \in [[1,p]]}$;
- A module for determining, for each exogenous class, said regression model associated with the sub-set of said reference sequence set of n-uplets $(x_{1i} \ldots x_{ni}; y_i)_{i \in [[1,p]]}$ by a regression modeling the value y of the endogenous parameter according to the values $x_1 \ldots x_n$ of the exogenous parameters from the set of n-uplets of the exogenous class;
- A module for calculating, for each n-uplet $(x_{1i} \ldots x_{ni}; y_i)_{i \in [[1,p]]}$ of the reference sequence set, an estimated value $\hat{y}_i^j$ of the endogenous parameter and of a residue $res_i^j$ associated for the exogenous class j of the n-uplet $(x_{1i} \ldots x_{ni}; y_i)_{i \in [[1,p]]}$;
- A module for calculating, for each n-uplet $(x_{1i} \ldots x_{ni}; y_i)_{i \in [[1,p]]}$ of the reference sequence set, the standardized value $y_{i\_norm}^j$ of the endogenous parameter relatively to the exogenous parameters, so as to obtain a set of reference sequence set of standardized n-uplets $(x_{1i} \ldots x_{ni}; y_{i\_norm})_{i \in [[1,p]]}$;
- A module for identifying, for each reference sequence of standardized n-uplets $(x_{1i} \ldots x_{ni}; y_{i\_norm})_{i \in [[1,p]]}$ at least one stabilized phase in said reference sequence of standardized n-uplets $(x_{1i} \ldots x_{ni}; y_{i\_norm})_{i \in [[1,p]]}$, a stabilized phase corresponding to a portion of said representative sequence of a flight time greater than a given threshold and wherein the values of the standardized n-uplets $(x_{1i} \ldots x_{ni}; y_{i\_norm})_{i \in [[1,p]]}$ are constant to within a given variance;
- A module for calculating, for each stabilized phase of each reference sequence, average values of the physical parameters on the portion of the sequence of n-uplets $(x_{1i} \ldots x_{ni}; y_{i\_norm})_{i \in [[1,p]]}$ corresponding to the stabilized phase, so as to obtain an n-uplet $\overline{x_1} \ldots \overline{x_n}; \overline{y}$ defining a potential snapshot of a flight of the aircraft 2;
- A module for classifying the n-uplets $\overline{x_1} \ldots \overline{x_n}; \overline{y}$ defining a potential snapshot obtained so as to generate a plurality of cells, each associated with a sub-set of n-uplets $\overline{x_1} \ldots \overline{x_n}; \overline{y}$ defining a potential snapshot;
- A module for calculating, for at least one generated cell, an n-uplet $x_{1s} \ldots x_{ns}; y_s$ of values of the physical parameters and an n-uplet $var_s(x_1) \ldots var_s(x_n); var_s(y)$ of values of variance associated so as to define a phase signature associated with the cell, and storing the phase signatures in said database of the data storage means 32.

The piece of equipment 3 is included as explained in a preferred way, into a system further comprising the aircraft 2 (preferentially a military aircraft) comprising the engine 1 and the sensors 20 measuring the values $x_{1\_exec} \ldots x_{n\_exec}; y_{exec}$ of the physical parameters of the engine 1.

Computer Program Product

According to a fourth and a fifth aspect, the invention relates to a computer program product comprising code instructions for executing (on data processing means 31, in particular those of the piece of equipment 3) a method according to the first aspect of the invention for monitoring an aircraft 2 engine 1 operating in a given environment, as well as storage means legible by a computer piece of equipment (for example the data storage means 32 of this piece of equipment 3) on which is found the computer program product.

The invention claimed is:

1. A method for monitoring an aircraft (2) engine (1) operating in a given environment, characterized in that it comprises the application by data processing means (31) of steps for:
   (a) Receiving a sequence of n-uplets $(x_{1\_exec} \ldots x_{n\_exec}; y_{exec})$ of values of physical parameters relating to said aircraft (2) engine (1), at least one endogenous parameter specific to the operation of the engine (1) and at least one exogenous parameter specific to said environment of which, said values being measured over time by sensors (20) so that each n-uplet of the sequence defines a point of flight of said aircraft (2), a set of reference sequences of n-uplets $(x_{1i} \ldots x_{ni}; y_i)_{i \in [[1,p]]}$ of values of said physical parameters being stored in a database stored on data storage means (32);
   (b) For each n-uplet $(x_{1\_exec} \ldots x_{n\_exec}; y_{exec})$ of the received sequence, calculation according to a regression model associated with a subset of said set of reference sequences of n-uplets $(x_{1i} \ldots x_{ni}; y_i)_{i \in [[1,p]]}$, of a standardized value $(y_{exec\_norm})$ of the endogenous parameter relatively to the exogenous parameters, so as to obtain a sequence of standardized n-uplets $(x_{1\_exec} \ldots x_{n\_exec}; y_{exec\_norm})$;
   (c) Identifying at least one stabilized phase in said standardized sequence of n-uplets $(x_{1\_exec} \ldots x_{n\_exec}; y_{exec\_norm})$ from a set of phase signatures stored in said database of the data storage means (32), each signature being defined by an n-uplet $(x_{1s} \ldots x_{ns}; y_s)$ of values of the physical parameters and an n-uplet $(var_s(x_1) \ldots var_s(x_n); var_s(y))$ of values of associated variance, a stabilized phase corresponding to a portion of said representative sequence of a flight time greater than a given threshold and wherein the values of the standard n-uplets $(x_{1\_exec} \ldots x_{n\_exec}; y_{exec\_norm})$ coincide with the values of the n-uplet $(x_{1s} \ldots x_{ns}; y_s)$ of a signature to within the associated variance, comparing the standardized sequence of n-uplets with a set of phase signatures to identify at least one stabilized phase of the flight;
   (d) For each said stabilized phase, calculating average values of the physical parameters on the portion of the sequence of n-uplets $(x_{1\_exec} \ldots x_{n\_exec}; y_{exec\_norm})$ corresponding to the stabilized phase, so as to obtain an n-uplet $(\overline{x_1} \ldots \overline{x_n}; \overline{y})$ defining a snapshot of said flight of the aircraft (2), and transmission to interface means (33).

2. The method according to one of claims 1, wherein each endogenous parameter is selected from among a pressure at the outlet of a booster of the engine (1), a static pressure at the inlet of a combustion chamber of the engine (1), a temperature at the outlet of the booster of the engine (1), a temperature of the exhaust gases of the engine (1), a fuel mass flow rate at the inlet of a High-Pressure compressor of the engine (1), and high-pressure rotation conditions at the inlet of the High-Pressure compressor of the engine (1).

3. The method according to one of claims 1, wherein each exogenous parameter is selected from an altitude, a temperature at the inlet of a fan of the engine (1), and low pressure rotation conditions at the inlet of the fan of the engine (1).

4. The method according to one of claims 1, comprising the addition of the received sequence of n-uplets $(x_{1\_exec}\ldots x_{n\_exec}; y_{exec})$ to the said set of reference sequences of n-uplets $(x_{1i}\ldots x_{ni}; y_i)_{i\in[[1,p]]}$.

5. The method according to claim 1, wherein the step (a) comprises the separation of the values $(x_{1\_exec}\ldots x_{n\_exec})$ of the exogenous parameters and of the values $(y_{exec})$ of the endogenous parameters.

6. The method according to claim 1, wherein step (b) comprises, for each n-uplet $(x_{1\_exec}\ldots x_{n\_exec}; y_{exec})$ of the received sequence, a preliminary step (b0) for determining an exogenous class of the n-uplet according to the values $(x_{1\_exec}\ldots x_{n\_exec})$ of the exogenous parameters of said n-uplet, from among a plurality of exogenous classes each defined by the values $(x_{1i}\ldots x_{ni})_{i\in[[1,p]]}$ of the exogenous parameters of a sub-set of said reference sequence set of n-uplets $(x_{1i}\ldots x_{ni}; y_i)_{i\in[[1,p]]}$.

7. The method according to claim 6, wherein the step (b0) comprises the projection of said n-uplet in the classes of contexts so as to identify the closest exogenous class according to a distance criterion.

8. The method according to one of claims 6, wherein the regression model used in step (b) for an n-uplet $(x_{1\_exec}\ldots x_{n\_exec}; y_{exec})$ of the received sequence is the model associated with the exogenous class determined for said n-uplet $(x_{1\_exec}\ldots x_{n\_exec}; y_{exec})$.

9. The method according to claim 8, comprising a preliminary phase for processing said set of reference sequences of n-uplets $(x_{1i}\ldots x_{ni}; y_i)_{i\in[[1,p]]}$ of the database, comprising the application by data processing means (31) of steps for:
- (a0) classification of the reference sequences of n-uplets $(x_{1i}\ldots x_{ni}; y_i)_{i\in[[1,p]]}$ so as to generate said plurality of exogenous classes;
- (a1) for each exogenous class, determining said regression model associated with the sub-set of said reference sequence set of n-uplets $(x_{1i}\ldots x_{ni}; y_i)_{i\in[[1,p]]}$ by a regression modelling the value y of the endogenous parameter according to the values $x_1\ldots x_n$ of the exogenous parameters from the set of n-uplets of the exogenous class;
- (a2) for each n-uplet $(x_{1i}\ldots x_{ni}; y_i)_{i\in[[1,p]]}$ of the set of reference sequence set, calculation for the exogenous class (j) of the n-uplet $(x_{1i}\ldots x_{ni}; y_i)_{i\in[[1,p]]}$ of an estimated value $(\hat{y}_i^j)$ of the endogenous parameter and of an associated residue $(res_i^j)$;
- (a3) For each n-uplet $(x_{1i}\ldots x_{ni}; y_i)_{i\in[[1,p]]}$ of the set of reference sequences, calculating the standardized value $(y_{i\_norm}^j)$ of the endogenous parameter relatively to the exogenous parameters, so as to obtain a set of standardized reference sequences of n-uplets $(x_{1i}\ldots x_{ni}; y_{i\_norm})_{i\in[[1,p]]}$;
- (a4) for each reference sequence of standardized n-uplets $(x_{1i}\ldots x_{ni}; y_{i\_norm})_{i\in[[1,p]]}$, identifying at least one stabilized phase in said standardized reference sequence of n-uplets $(x_{1i}\ldots x_{ni}; y_{i\_norm})_{i\in[[1,p]]}$, a stabilized phase corresponding to a portion of said representative sequence of a flight time greater than a given threshold and wherein the values of the standardized n-uplets $(x_{1i}\ldots x_{ni}; y_{i\_norm})_{i\in[[1,p]]}$ are constant to within a given variance;
- (a5) for each stabilized phase of each reference sequence, calculating average values of the physical parameters on the portion of the sequence of n-uplets $(x_{1i}\ldots x_{ni};$ $y_{i\_norm})_{i\in[[1,p]]}$ corresponding to the stabilized phase, so as to obtain an n-uplet $(\overline{x_1}\ldots \overline{x_n}; \overline{y})$ defining a potential snapshot of a flight of the aircraft (2);
- (a6) classifying the n-uplets $(\overline{x_1}\ldots \overline{x_n}; \overline{y})$ defining a potential snapshot obtained so as to generate a plurality of cells, each associated with a subset of the n-uplets ($\overline{x_1}\ldots \overline{x_n}; \overline{y}$) defining a potential snapshot;
- (a7) for at least one generated cell, calculating an n-uplet $(x_{1s}\ldots x_{ns}; y_s)$ of values of the physical parameters and an n-uplet $(var_s(x_1)\ldots var_s(x_n); var_s(y))$ of values of associated variance so as to define a signature of a phase associated with the cell, and storage of the phase signatures in said database of the data storage means (32).

10. The method according to claim 9, wherein the classification of the steps (a0) and (a6) is applied according to a non-supervised method selected from among the algorithm of k-averages, the method of self-adaptive maps of Kohonen and the hierarchical ascending classification (HAC).

11. The method according to claim 9, wherein the step (a6) comprises, for each generated cell, the calculation of a density of the cell defined as the number of reference sequences for which the cell comprises at least one n-uplet $(\overline{x_1}\ldots \overline{x_n}; \overline{y})$ defining an obtained potential snapshot, the step (a7) being applied for the cells having the highest density.

12. A piece of equipment (3) for monitoring an aircraft (2) engine (1) operating in a given environment, comprising:
- data processing means (31),
- data storage means (32) storing in a database:
  - a set of reference sequences of n-uplets $(x_{1i}\ldots x_{ni}; y_i)_{i\in[[1,p]]}$ of values of physical parameters relating to said aircraft (2) engine (1), for which at least one endogenous parameter specific to the operation of the engine (1) and at least one exogenous parameter specific to said environment, and
  - a set of phase signatures, each signature being defined by an n-uplet $(x_{1s}\ldots x_{ns}; y_s)$ of values of the physical parameters and an n-uplet $(var_s(x_1)\ldots var_s(x_n); var_s(y))$ of values of associated variance,
- interface means (33), the piece of equipment (3) being characterized in that the data processing means (31) are configured for applying:
- A module for receiving a sequence of n-uplets $(x_{1\_exec}\ldots x_{n\_exec}; y_{exec})$ of values of the physical parameters relating to said aircraft (2) engine (1), said values being measured over time by sensors (20) so that each n-uplet of the sequence defines a point of flight of said aircraft (2);
- A module for calculating, for each n-uplet $(x_{1\_exec}\ldots x_{n\_exec}; y_{exec})$ of the received sequence, according to a regression model associated with a subset of said set of reference sequences of n-uplets $(x_{1i}\ldots x_{ni}; y_i)_{i\in[[1,p]]}$, of a standardized value $(y_{exec\_norm})$ of the endogenous parameter relatively to the exogenous parameters, so as to obtain a sequence of standardized n-uplets $(x_{1\_exec}\ldots x_{n\_exec}; y_{exec\_norm})$;
- A module for identifying at least one stabilized phase in said sequence of standardized n-uplets $(x_{1\_exec}\ldots x_{n\_exec}; y_{exec\_norm})$ from said set of phase signatures, a stabilized phase corresponding to a portion of said sequence representative of a flight time greater than a given threshold and wherein the values of the standardized n-uplets $(x_{1\_exec}\ldots x_{n\_exec}; y_{exec\_norm})$ coincide with the values of the n-uplet $(x_{1s}\ldots x_{ns}; y_s)$ of a signature to within the associated variance;

A module for calculating, for each stabilized phase, average values of the physical parameters on the portion of the sequence of n-uplets ($x_{1\_exec} \ldots x_{n\_exec}$; $y_{exec\_norm}$) corresponding to the stabilized phase, so as to obtain an n-uplet ($\overline{x_1} \ldots \overline{x_n}$; $\overline{y}$) defining a snapshot of said flight of the aircraft (2); and A module for transmission of the snapshots to the interface means (33).

13. The piece of equipment according to claim 12, wherein the data processing module (31) is further configured for applying:

A module for classifying reference sequences of n-uplets ($x_{1i} \ldots x_{ni}$; $y_i)_{i \in [[1,p]]}$ so as to generate a plurality of exogenous classes each defined by the values ($x_{1i} \ldots x_{ni})_{i \in [[1,p]]}$ of the exogenous parameters of a subset of said set of reference sequences of n-uplets ($x_{1i} \ldots x_{ni}$; $y_i)_{i \in [[1,p]]}$;

A module for determining, for each exogenous class, said regression model associated with the sub-set of said set of reference sequences of n-uplets($x_{1i} \ldots x_{ni}$; $y_i)_{i \in [[1,p]]}$ by a regression modeling the value y of the endogenous parameter according to the values $x_1 \ldots x_n$ of the exogenous parameters from the set of n-uplets of the exogenous class;

A module for calculating, for each n-uplet ($x_{1i} \ldots x_{ni}$; $y_i)_{i \in [[1,p]]}$ of the set of reference sequences, an estimated value ($\hat{y}_i^j$) of the endogenous parameter and an associated residue ($res_i^j$) for the exogenous class (j) of the n-uplet ($x_{1i} \ldots x_{ni}$; $y_i)_{i \in [[1,p]]}$;

A module for calculating, for each n-uplet ($x_{1i} \ldots x_{ni}$; $y_i)_{i \in [[1,p]]}$ of the set of reference sequences, the standardized value ($y_{i\_norm}^j$) of the endogenous parameter relatively to the exogenous parameters, so as to obtain a set of reference sequences of standardized n-uplets ($x_{1i} \ldots x_{ni}$; $y_{i\_norm})_{i \in [[1,p]]}$;

A module for identifying, for each reference sequence of standardized n-uplets ($x_{1i} \ldots x_{ni}$; $y_{i\_norm})_{i \in [[1,p]]}$, at least a stabilized phase in said reference sequence of standardized n-uplets ($x_{1i} \ldots x_{ni}$; $y_{i\_norm})_{i \in [[1,p]]}$, a stabilized phase corresponding to a portion of said sequence representative of a flight time greater than a given threshold and wherein the values of the standardized n-uplets ($x_{1i} \ldots x_{ni}$; $y_{i\_norm})_{i \in [[1,p]]}$ are constant to within a given variance;

A module for calculating, for each stabilized phase of each reference sequence, average values of the physical parameters on the portion of the sequence of n-uplets ($x_{1i} \ldots x_{ni}$; $y_{i\_norm})_{i \in [[1,p]]}$ corresponding to the stabilized phase, so as to obtain an n-uplet ($\overline{x_1} \ldots \overline{x_n}$; $\overline{y}$) defining a potential snapshot of a flight of the aircraft (2);

A module for classifying the n-uplets ($\overline{x_1} \ldots \overline{x_n}$; $\overline{y}$) defining a potential snapshot obtained so as to generate a plurality of cells, each associated with a subset of the n-uplets ($\overline{x_1} \ldots \overline{x_n}$; $\overline{y}$) defining a potential snapshot;

A module for calculating, for at least one generated cell, an n-uplet ($x_{1s} \ldots x_{ns}$; $y_s$) of values of the physical parameters and an n-uplet ($var_s(x_1) \ldots var_s(x_n)$; $var_s(y)$) of associated variance values so as to define a phase signature associated with the cell, and storing the phase signature in said database of the data storage means (32).

* * * * *